(12) United States Patent
Haeberer et al.

(10) Patent No.: US 8,184,964 B2
(45) Date of Patent: May 22, 2012

(54) TANK FOR STORING A REDUCING AGENT

(75) Inventors: Rainer Haeberer, Bretten (DE);
Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 533 days.

(21) Appl. No.: 12/444,299

(22) PCT Filed: Aug. 8, 2007

(86) PCT No.: PCT/EP2007/058213
§ 371 (c)(1),
(2), (4) Date: Apr. 3, 2009

(87) PCT Pub. No.: WO2008/040589
PCT Pub. Date: Apr. 10, 2008

(65) Prior Publication Data
US 2010/0025408 A1  Feb. 4, 2010

(30) Foreign Application Priority Data
Oct. 4, 2006 (DE) .......................... 10 2006 046 899

(51) Int. Cl.
*A47J 27/00* (2006.01)
(52) U.S. Cl. ...................................... 392/441

(58) Field of Classification Search ................. None
See application file for complete search history.

(56) References Cited

U.S. PATENT DOCUMENTS

| 2007/0035832 A1 | 2/2007 | Hirata et al. |
| 2007/0202019 A1 | 8/2007 | Nishina et al. |

FOREIGN PATENT DOCUMENTS

| DE | 19841770 A1 | 4/2000 |
| JP | 2006125317 A | 5/2006 |
| WO | 2005066471 A1 | 7/2005 |
| WO | 2005073527 A1 | 8/2005 |
| WO | 2006046363 A1 | 5/2006 |
| WO | 2007017080 A1 | 2/2007 |
| WO | 2007031467 A2 | 3/2007 |

*Primary Examiner* — Thor Campbell
(74) *Attorney, Agent, or Firm* — Ronald E. Greigg

(57) ABSTRACT

The invention relates to a tank for storing a reducing agent, in particular a liquid reducing agent. The reducing agent reduces the nitrogen oxides from the waste gases of the internal combustion engine to nitrogen and water. The tank includes an external container in which an internal container is accommodated. A heating element is provided in the internal container and the liquid reducing agent can be removed by a removal device. The internal container is connected to the external container in such a way that the liquid reducing agent can flow out from the internal container into the external container.

26 Claims, 4 Drawing Sheets

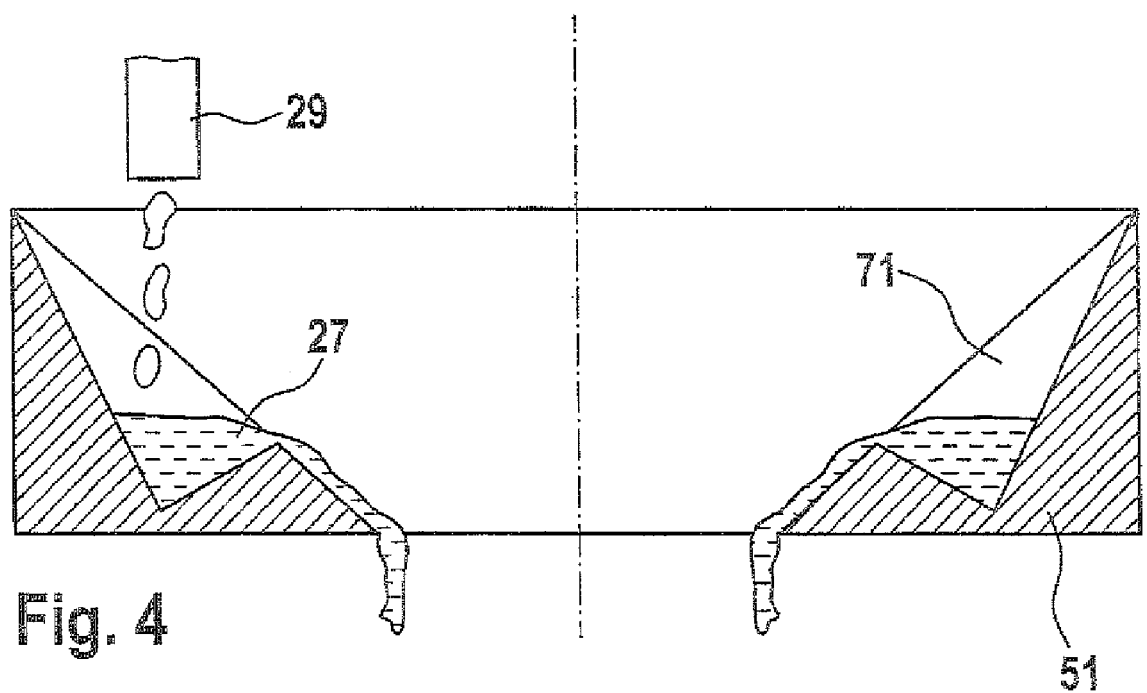

TANK FOR STORING A REDUCING AGENT

CROSS-REFERENCE TO RELATED APPLICATION

This application is a 35 USC 371 application of PCT/EP 2007/058213 filed on Aug. 8, 2007.

BACKGROUND OF THE INVENTION

1. Field of the Invention

The invention relates to a tank for storing a reducing agent.

2. Description of the Prior Art

The invention relates to a tank for storing a reducing agent as generically defined by the preamble to claim 1.

In internal combustion engines, especially diesel-fueled internal combustion engines, because of the more-stringent laws on exhaust gas expected in the next few years, among other things the proportion of nitrogen oxides in the exhaust gas must be reduced. For reducing of the proportion of nitrogen oxide in the exhaust gas, selective catalytic reduction is for instance performed, in which the nitrogen oxides are reduced with the aid of reducing agents to nitrogen and water. An aqueous urea solution, for instance, is used as the reducing agent.

The reducing agent is typically stored in a tank and fed via a line from the tank to a metering module, with which the reducing agent is injected for instance into the exhaust gas tube.

The usual reducing agents used at present, depending on the anti-freeze agent added, freeze at a temperature in the range from −11° C. to −40° C. If the demands in terms of the exhaust gas composition are to be met, it must be assured that even at temperatures below −11° C., reducing agent will be adequately available after an acceptable length of time. This makes it necessary under some circumstances to thaw out the reducing agent. In utility vehicles, for example, a connectable heater is used, which is operated via the engine coolant. This connectable heater is capable of thawing the contents of the entire tank.

However, since in passenger cars, for instance, the engine and the tank for the reducing agent are generally located far apart from one another, heating the tank for the reducing agent with the aid of the coolant of the engine is difficult. For this reason, in passenger cars, a limited volume of the tank, which is received in a partial container in the tank, is heated electrically. In tanks for the reducing agent that are in current use, it is possible to travel up to 1000 km with this thawed volume. In temperate climate zones, this thawed partial volume, in conjunction with the use of reducing agents with antifreeze additives is considered sufficient to assure uninterrupted operation. This also takes into account the fact that freezing the reducing agent in the tank in conjunction with purposeful insulation and intentional freezing can take several days.

ADVANTAGES AND SUMMARY OF THE INVENTION

The tank according to the invention for storing a reducing agent includes an external container in which an internal container is received, and a heating element is received in the internal container. With a first removal line, liquid can be removed from the internal container. The internal container communicates with the external container in such a way that reducing agent can flow out of the internal container into the external container.

The advantage of the tank embodied according to the invention is that with it, a tank for storage can be made available with which use is made possible outside the temperate climate region, or in other words at lower, longer-lasting ambient temperatures. Once the reducing agent in the external container and in the internal container has frozen solid, the reducing agent in the internal container is thawed out first by the heating element. This liquid reaches the external container, and as a result the solidly frozen liquid contained in the external container is thawed as well.

In a preferred embodiment, at least one opening is embodied in the internal container, and through this opening, liquid can flow out of the external container into the internal container and vice versa. When motion of the tank occurs, already-thawed reducing agent sloshes through the at least one opening from the internal container into the external container. Thawing of the frozen liquid in the external container is accomplished by means of this liquid that sloshes over. The motion of the tank results for instance from motions of a motor vehicle during travel.

To reinforce the thawing process in the external container, in one embodiment heat-conducting baffles that protrude into the external container are embodied on the internal container. As soon as a higher temperature prevails in the internal container than in the external container, heat is dissipated to the reducing agent in the external container via the heat-conducting baffles. In this way, the reducing agent in the external container surrounding the heat-conducting baffles is thawed out as well. The heat-conducting baffles can be embodied in any way familiar to one skilled in the art. Preferably, the heat-conducting baffles, in the form of ribs, surround the internal container. The heat-conducting baffles can be embodied as either structured or smooth.

In one embodiment, the at least one opening in the internal container is disposed such that the heating element is completely covered by liquid when the internal container is filled with liquid up to the at least one opening. This assures that heat is dissipated from the heating element only to liquid. As a result, more-effective thawing can be attained, since the heat transfer to liquids is better than the heat transfer to gas. The dissipation of heat from the heating element to the ambient air in the internal container is avoided.

A return, by way of which unused liquid reducing agent is returned, preferably discharges into the internal container. The liquid reducing agent returning via the return likewise reinforces the thawing process in the tank for storing the reducing agent. Through the at least one opening in the internal container, the returned liquid reducing agent sloshes into the external container as well and thus likewise reinforces the thawing of the reducing agent in the external container.

In a further embodiment, the internal container is surrounded by a funnel-shaped element. The funnel-shaped element is preferably made from a material that has a lesser density tan the reducing agent. This assures that the funnel-shaped element will float on the reducing agent. The material from which the funnel-shaped element is made is preferably a good thermal conductor. Between the funnel-shaped element and the internal container, there is a gap through which liquid reducing agent, which is flowing for example to the funnel-shaped element via a return, can flow along the outer wall of the internal container, so that as a result the reducing agent contained in the external container is thawed. For instance, unused reducing agent flows back to the tank via the return. To keep the gap between the funnel-shaped element and the internal container constant, the tunnel-shaped element is movable in the axial direction, for instance via a guide. The guide may for instance be embodied on the inside of the funnel-shaped element, that is, oriented toward the internal container. Alternatively, it is also possible for the funnel-shaped element to be guided for instance by an axial and/or radial suspension in the interior of the external container.

In a preferred embodiment, an encompassing groove, in which liquid that is returned via the return initially collects, is embodied in the funnel-shaped element. As soon as the groove is filled with liquid, liquid flows out of the groove via the funnel-shaped element into the external container. By means of the liquid accumulated in the groove, the funnel-shaped element is warmed up. It outputs this heat to the reducing agent in the external container. This additionally reinforces the thawing.

A sump is preferably embodied in the bottom of the external container. By means of the sump, it is assured that even if the tank for storing the reducing agent is tilted, for instance in sloping positions or when cornering, only liquid is aspirated, but not air. For that purpose, in one embodiment, a second removal line, with which liquid can be removed from the external container, discharges preferably into the sump.

The first removal line, with which liquid can be removed from the internal container, preferably discharges in the vicinity of the bottom of the internal container. This assures that even if only a small quantity of liquid is contained in the internal container, it can still be removed from the internal container.

In a preferred embodiment, the first removal line and the second removal line each discharge in the vicinity of the heating element into the internal container and the external container, respectively. Since the reducing agent is first thawed in the immediate surroundings around the heating element, this arrangement assures that even after a short time, liquid reducing agent can be removed via the removal lines from the tank for storing the reducing agent.

To be able to remove the liquid reducing agent from the tank for storage, the first removal line and the second removal line generally communicate with a supply pump. With the aid of the supply pump, the liquid reducing agent is aspirated from the internal container and from the external container via the first removal line and the second removal line, respectively. Preferably, throttle elements are embodied in the first removal line and in the second removal line. The throttle elements are preferably adapted to one another such that liquid reducing agent can be removed simultaneously from the internal container and from the external container when liquid reducing agent is contained in both the internal container and the external container. To enable rapid thawing after freezing, the throttle elements are preferably designed such that because of the return of reducing agent via the return, the internal container is always filled up to the at least one opening.

BRIEF DESCRIPTION OF THE DRAWINGS

The exemplary embodiments of the invention are described in further detail in the ensuing description in conjuction with the drawings, in which:

FIG. 4 shows a funnel-shaped element with a groove embodied in it.

DESCRIPTION OF THE PREFERRED EMBODIMENTS

Figure 1:
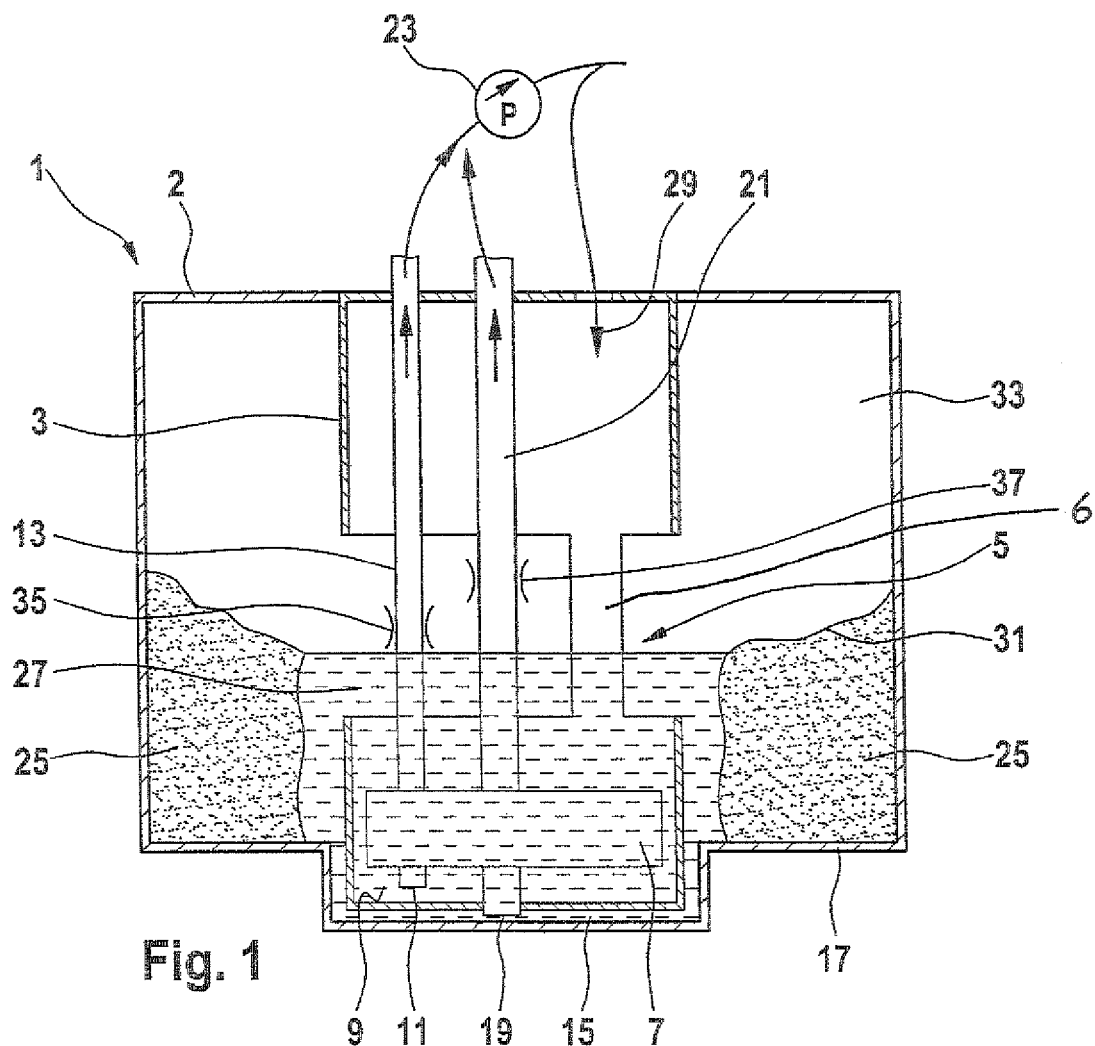
FIG. 1 shows a tank for storing a reducing agent, having openings in the internal container.

In FIG. 1, a tank for storing a reducing agent, with openings in the internal container, is shown.

According to the invention, a reducing agent is contained in the external container 2 and in the internal container 3. This reducing agent is for instance an aqueous urea solution, which is used as a reducing agent in order to reduce nitrogen oxides to nitrogen and water. To that end, the reducing agent is injected into an exhaust gas tube of the internal combustion engine upstream of an SCR (selective catalytic reduction) catalytic converter. The injection of the reducing agent is effected via a metering valve, for instance. In the hot exhaust gas from the engine, the reducing agent evaporates and forms ammonia, which accumulates in the SCR catalytic converter. The ammonia that accumulates in the catalytic converter converts the nitrogen oxides, contained in the exhaust gas, into elemental nitrogen and water vapor. The reducing agent is stored in a tank 1 embodied according to the invention.

The tank 1 includes an external container 2, in which an internal container 3 is received. In the internal container 3, at least one opening 5 is embodied, through which liquid can flow out of the internal container 3 into the external container 2, and vice versa. Between each two adjacent openings 5, a web 6 remains in the wall of the internal container 3.

So that even at temperatures that are below the freezing temperature of the reducing agent liquid reducing agent can still be removed, a heating element 7 is received in the internal container 3. The heating element 7 is preferably an electrical heating element, but any other heating element known to one skilled in the art can be employed instead. For instance, it is also conceivable for the heating to be done with a liquid.

The heating element 7 is preferably disposed in the vicinity of the bottom 9 of the internal container 3. An intake opening 11 of a first removal line 13 is disposed in the vicinity of the heating element 7. Because of this positioning of the intake opening 11 of the first removal line 3 in the vicinity of the heating element 7, it is possible, even if the reducing agent in the internal container 3 and in the external container 2 had been completely frozen, to remove liquid reducing agent after only a short thawing time. The intake opening 11 continues to be located preferably in the vicinity of the bottom 9 of the internal container 3 so that even if only a small quantity of reducing agent is contained in the internal container 3, reducing agent can still be removed from the internal container.

The tank 1 according to the invention for storing a reducing agent is preferably used in a motor vehicle. Since a motor vehicle moves, and thus the reducing agent in the internal container 3 and in the external container 2 can also move, a sump 15 is embodied on the external container 2. The sump 15 is preferably shaped as a bulge in the bottom 17 of the external container 2. The sump 15 assures that even under extreme conditions, such as sloping positions of the vehicle or when cornering, no air, but only liquid reducing agent, is aspirated. To that end, an intake opening 19 of a second removal line 21 is disposed in the region of the sump 15. Via the second removal line 21, liquid reducing agent is removed from the external container 2.

Especially preferably, the first removal line 13 and the second removal line 21 are heated. For that purpose, a heating element, for example, surrounds the first removal line 13 and the second removal line 21. As a result of the heating, any reducing agent contained in the removal lines 13, 21 is melted. The reducing agent surrounding the removal lines 13, 21 melts as well, so that no frozen reducing agent is located any longer between the liquid reducing agent and an air chamber 33 in the tank 1. Thus when reducing agent is removed from the tank via one of the removal lines 13, 21, no underpressure develops under a layer of frozen reducing agent.

The internal container 3 preferably, as shown in FIG. 1, protrudes into the sump 15. By the positioning of the heating element 7 in the vicinity of the bottom 9 of the internal container 3, the intake opening 19 of the second removal line 21 is also located in the vicinity of the heating element 7. As a result, it is assured that both the intake opening 11 of the first removal line 13 and the intake opening 19 of the second removal line 21 will have thawed after only a brief heating period.

The at least one opening 5 in the internal container 3 is disposed such that the heating element 7 is completely covered with reducing agent if the internal container 3 is filled with reducing agent up to the at least opening 5. Because of this positioning of the at least one opening 5, whenever the heating element 7 is completely covered, heat is output only to the reducing agent.

To be able to remove liquid reducing agent from the external container 2 and the internal container 3, the first removal line 13 and the second removal line 21 communicate with a pump 23. Any arbitrary pump with which a liquid can be pumped is suitable as the pump 23.

At temperatures below the melting point of the reducing agent, the reducing agent freezes. The freezing process begins at the walls of the external container 2 and continues into the interior of the external container 2. If an aqueous urea solution is used as the reducing agent, then it freezes at a temperature in the range between −11° C. and −40° C. The temperature depends on how much antifreeze or which antifreeze has been added to the reducing agent. In general, it takes several days until the reducing agent is completely frozen. To be able to meet the legal requirements in terms of exhaust gas composition, however, it is necessary that even with fully frozen reducing agent, a nitrogen oxide reduction will be performed in the exhaust gas after only a short time after starting of the engine. For that purpose, it is necessary that the reducing agent be rapidly thawed. In the illustrations in the figures, the reducing agent is only partially frozen. Frozen areas in the reducing agent are marked by reference numeral 25. In the area around the heating element 7, the reducing agent has already thawed and is thus in the form of a liquid. The area in which the reducing agent is in liquid form is marked by reference numeral 27. If the reducing agent in the internal container 3 and in the external container 2 is completely frozen, then, when heat is introduced via the heating element 7, the reducing agent begins to melt, first in the surroundings around the heating element 7. As soon as the reducing agent in the area around the heating element 7 has melted, it can be removed from the internal container 3 via the intake opening 11 and the first removal line 13.

To speed up the melting process, a greater quantity of liquid reducing agent is removed than is needed for the catalytic reduction of the nitrogen oxides. The unneeded liquid reducing agent is returned to the internal container 3 via a return 29. The heated liquid reducing agent that is being returned into the internal container 3 via the return 29 reinforces the heating element 7 in melting the frozen reducing agent 25. By the motion of the motor vehicle, the liquid reducing agent returned to the internal container 3 sloshes through the at least one opening 5 into the external container 2. As a consequence, the frozen reducing agent 25 in the external container 2 begins to melt as well. Because of the sloshing motion of the liquid reducing agent 27, an inclined boundary face 31 with an air chamber 33, which is located above the reducing agent, is created at the frozen reducing agent 25. To prevent the external container 2 from tearing if the reducing agent is completely frozen, the external container 2 is not completely filled with the reducing agent; instead, there is always a small air chamber 33 above the reducing agent. In general, the air chamber 33 is filled with ambient air.

Because of the closeness of the sump 15 to the heating element 7, the reducing agent in the sump 15 begins to melt as soon as the reducing agent at the bottom 9 of the internal container 3 has melted. Even in the immediate surroundings around the internal container 3, the reducing agent begins to melt as soon as the reducing agent in the internal container 3 has melted. As soon as the reducing agent in the sump 15 is melted and the liquid reducing agent 27 in the external container 2 is in contact with the air chamber 33, liquid reducing agent 27 is removed, via the intake opening 19 and the second removal line 21. The liquid reducing agent 27, which is removed via the second removal line 21 but not needed for the catalytic conversion, is returned to the internal container 3 via the return 29. This likewise reinforces the heating element 7 in melting the frozen reducing agent 25, until all the reducing agent has melted.

A first throttle element 35 is embodied in the first removal line 13. A second throttle element 37 is contained in the second removal line 21. Via the throttle elements 35, 37, the removal lines 13, 21 are adapted to one another in such a way that whenever there is liquid reducing agent 27 in both the internal container 3 and the external container 2, the reducing agent is removed from both containers 2, 3. The first throttle element 35 and the second throttle element 37 are designed such that the internal container 3 is always filled up to the at least one opening 5. Not until the volume of liquid contained is less than the volume of the internal container 3 up to the lower edge of the at least opening 5 does the liquid level in the internal container 3 drop further.

Figure 2:
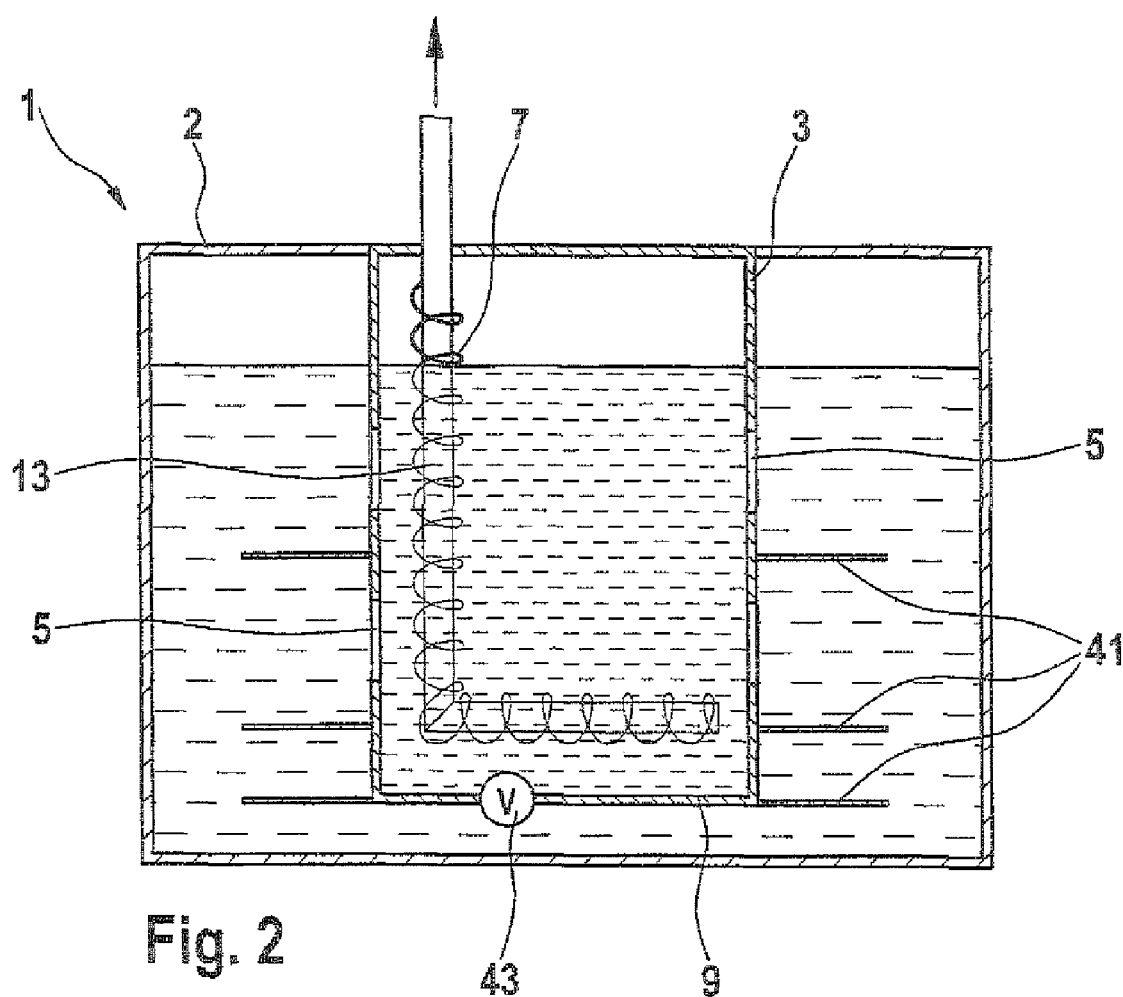
FIG. 2 shows a tank for storing a reducing agent, having heat-conducting baffles on the internal container.

In FIG. 2, a tank embodied according to the invention for storing a reducing agent is shown in which heat-conducting baffles are mounted on the internal container.

The tank 1, in the embodiment shown in FIG. 2, includes the internal container 3, which is received in the external container 2. Heat-conducting baffles 41 are embodied on the internal container 3. The heat-conducting baffles 41 protrude into the external container 2. Once the reducing agent in the internal container 3 has become warm, it outputs heat to the wall of the internal container 3. Via the wall of he internal container 3, the heat is transmitted to the heat-conducting baffles 41. The heat-conducting baffles 41 heat up and thus output heat to the reducing agent contained in the external container 2. The heat-conducting baffles 41 are embodied for instance as ribs around the internal container 3. The surface of the heat-conducting baffles 41 may be smoothed or structured. Preferably, the surface of the heat-conducting baffles is structured, since then they have a greater surface area. To prevent reducing agent from remaining behind in the structure of the heat-conducting baffles 41, the structure is preferably embodied such that the reducing agent retained on the heat-conducting baffles 41 can flow off of them.

To enable removing the reducing agent from the tank 1, the removal line 13 is disposed in the internal container 3. The removal line 13 leads first to a supply pump, not shown, and from there to a metering valve, with which the reducing agent is metered into the SCR catalytic converter. So that reducing agent can be removed from the internal container 3 even whenever the reducing agent in the tank 1 is completely frozen solid and rigid, the removal line 13 is surrounded by the heating element 7, which is embodied as a heating coil. As soon as heat is output from the heating element 7, this heat is transmitted into the interior of the removal line 13 as well. Thus the reducing agent contained in the removal line 13 also thaws.

Unlike the embodiment shown in FIG. I, in the embodiment shown here in FIG. 2, only one removal line is provided. So that reducing agent can flow out of the external container 2 into the internal container 3, a valve 43 is embodied on the bottom 9 of the internal container 3. The valve 43 is for instance a T-valve, which opens whenever the pressure in the external container 2 acting on the valve is greater than the pressure in the internal container 3. That is always the case whenever the fill level in the external container 2 is higher than the fill level in the internal container 3.

In the embodiment shown in FIG. 2 as well, the melting of the reducing agent in the external container 2 is reinforced by sloshing motions of the already-thawed reducing agent. The openings 5 in the internal container 3, heated reducing agent can flow out of the internal container 3 into the external container 2. This kind of flowing motion is engendered especially whenever the tank 1 is in motion. If the tank 1 is contained in the motor vehicle, then this is for instance always the case when the motor vehicle is moving.

Figure 3:
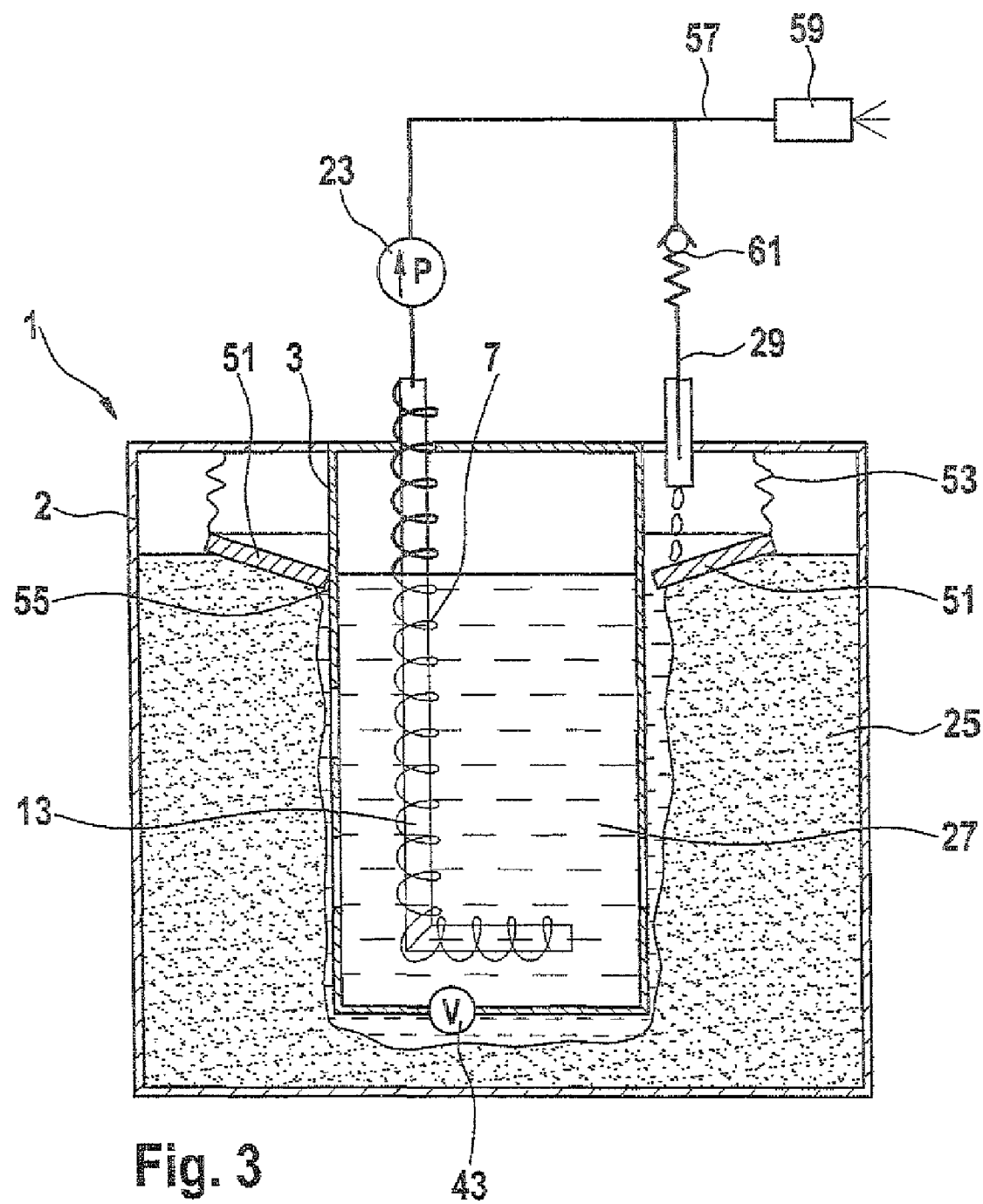
FIG. 3 shows a tank for storing a reducing agent, in which the internal container is surrounded by a funnel-shaped element.

In FIG. 3, a tank embodied according to the invention is shown, with a funnel-shaped element.

In this embodiment as well the reducing agent in the internal container 3 is thawed first. For that purpose, the heating element 7 is received in the internal container 3. As in the embodiment shown in FIG. 2, the heating element 7 is embodied as a heating coil and is disposed around the removal line 13, so that the reducing agent contained in the removal line 13 can be thawed by the heating element 7. To reinforce the process of thawing the frozen reducing agent 25 in the external container 2, the internal container 3 is surrounded by a funnel-shaped element 51. The funnel-shaped element 51, in the embodiment shown here, is extended through a suspension 53. The funnel-shaped element 51 is made from a material which is a good heat conductor and which has a lesser density than the reducing agent. This assures that the funnel-shaped element 51 will always float on the reducing agent. Even if the reducing agent is frozen, the funnel-shaped element 51 rests on the frozen reducing agent 25. Plastic or special steel is a preferred material for the funnel-shaped element 51.

So that the funnel-shaped element 51 can reinforce the thawing process, the return 29, by way of which heated reducing agent is returned to the tank 1, is disposed above the funnel-shaped element 51. The liquid reducing agent returned via the return 29 thus drips onto the fuel-shaped element 51. As a result of the liquid reducing agent, the funnel-shaped element 51 is heated and outputs the heat to the frozen reducing agent 25. The frozen reducing agent 25 thaws in the region of the funnel-shaped element 51. The liquid reducing agent flows away via the funnel-shaped element 51 and flows along the outer wall of the internal container 3 through a gap 55, which is embodied between the internal container 3 and the funnel-shaped element 51, into the external container 2. As a result, first, the process of thawing the liquid reducing agent along the wall of the internal container 3 is reinforced. From motion of the motor vehicle, when the tank 1 is used in a motor vehicle, the liquid reducing agent 27 begins to move and thus reinforces the thawing process of the frozen reducing agent 25.

Besides by means of the suspension 53, it is additionally possible for the funnel-shaped element 51 to be supported on the internal container 3. The support of the funnel-shaped element 51 prevents unwanted tilting of the funnel-shaped element.

The removal of the liquid reducing agent is effected in the embodiment shown in FIG. 3 in the same way as in the embodiment shown in FIG. 2, via the removal line 13, which communicates with the pump 23. From the pump 23, the liquid reducing agent is transported via a line 57 to a metering valve 59, with which the reducing agent is added to the SCR catalytic converter. The return 29 branches off from the line 57. The reducing agent that is pumped via the pump 23 in the direction of the metering valve 59 but is not fed by the metering valve 59 to the SCR catalytic converter is returned via the return 29. To keep the supply pressure in the line 57 constant, a check valve 61 is received in the return 29. This check valve does not open until the pressure in the line 57 rises above the opening pressure of the check valve 51.

As in the embodiment shown in FIG. 2 as well, the filling of the internal container 3 with the reducing agent contained in the external container 2 takes place via the valve 43, which here again is embodied as a T-valve. It is understood that besides the valve embodied as a T-valve, any other valve that can be opened by the hydrostatic pressure of the reducing agent in the outer tank 2 can be used as the valve 43. It is preferable that the valve 43 not be externally actuated.

In FIG. 4, the funnel-shaped element 51 is shown in detail.

A groove 71 is embodied in the funnel-shaped element 51. In the groove 71, liquid reducing agent 27 that flows back into the tank through the return 29 collects. As a result of the liquid reducing agent 27 that has accumulated in the groove 71, the funnel-shaped element 51 warms up. Since the funnel-shaped element 51 is preferably made from a material that is a good heat conductor, it outputs the heat of the liquid reducing agent 27 to the surroundings. If the funnel-shaped element 51 is now resting on frozen reducing agent 25, it thus outputs the heat of the liquid reducing agent 27 to the frozen reducing agent 25, so that the frozen reducing agent begins to melt. As a result, the thawing process is reinforced by the funnel-shaped element 51.

In all the embodiments shown, the process of thawing the reducing agent in the external container 2 is reinforced by sloshing motions of the liquid reducing agent 27, and the sloshing motions of the liquid reducing agent 27 are generated by motions of the tank 1. Particularly in the case when the tank 1 is used in a motor vehicle, the sloshing motions are generated by the motions of the motor vehicle.

The foregoing relates to the preferred exemplary embodiments of the invention, it being understood that other variants and embodiments thereof are possible within the spirit and scope of the invention, the latter being defined by the appended claims.

The invention claimed is:

1. A tank for storing a reducing agent, in particular a liquid reducing agent, with which nitrogen oxides from exhaust gases of internal combustion engines are reduced to nitrogen and water, comprising:
   an external container having a bottom wall;
   an internal container received in the external container, the internal container having a bottom wall spaced from said external container bottom wall and connected with the external container in such a way that liquid reducing agent can flow out of the internal container into the external container;

a heating element is received in the internal container;

a removal device for removing the liquid reducing agent from the tank having a first removal line having a first end extending out of said tank and a second end disposed adjacent said bottom wall of said internal container, and a second removal line having a first end extending out of said tank and a second end extending through said bottom wall of said internal container and into said external container; and at least one opening embodied in the internal container through which the reducing agent can flow out of the external container into the internal container and vice versa, the at least one opening being disposed in the internal container in such a way that reducing agent covers the heating element when the internal container is filled with reducing agent up to the at least one opening.

2. The tank as defined by claim 1, wherein a return discharges into the internal container, and by way of the return, unused liquid reducing agent is returned.

3. The tank as defined by claim 2, wherein a sump is embodied in a bottom of the external container.

4. The tank as defined by claim 3, wherein said second removal line, with which reducing agent can be removed from the external container, draws fluid from the sump.

5. The tank as defined by claim 4, wherein said first and second removal lines each draw fluid from the internal container and the external container, respectively, in the vicinity of the heating element.

6. The tank as defined by claim 5, wherein throttle elements are embodied in the first removal line and in the second removal line.

7. The tank as defined by claim 6, wherein the throttle elements in the first removal line and in the second removal line are adapted such that reducing agent is removed simultaneously from the internal container and from the external container when reducing agent is contained in both the internal container and the external container.

8. The tank as defined by claim 6, wherein the throttle elements are adapted to one another such that the internal container is filled up to the at least one opening because of returning reducing agent.

9. The tank as defined by claim 7, wherein the throttle elements are adapted to one another such that the internal container is filled up to the at least one opening because of returning reducing agent.

10. The tank as defined by claim 2, wherein said first and second removal lines each draw fluid from the internal container and the external container, respectively, in the vicinity of the heating element.

11. The tank as defined by claim 10, wherein throttle elements are embodied in the first removal line and in the second removal line.

12. The tank as defined by claim 11, wherein the throttle elements in the first removal line and in the second removal line are adapted such that reducing agent is removed simultaneously from the internal container and from the external container when reducing agent is contained in both the internal container and the external container.

13. The tank as defined by claim 11, wherein the throttle elements are adapted to one another such that the internal container is filled up to the at least one opening because of returning reducing agent.

14. The tank as defined by claim 12, wherein the throttle elements are adapted to one another such that the internal container is filled up to the at least one opening because of returning reducing agent.

15. A tank for storing a reducing agent, in particular a liquid reducing agent, with which nitrogen oxides from exhaust gases of internal combustion engines are reduced to nitrogen and water, comprising:

an external container;

an internal container received in the external container, the internal container connected with the external container in such a way that liquid reducing agent can flow out of the internal container into the external container;

a heating element is received in the internal container;

a removal device for removing the liquid reducing agent from the tank having at least one removal line;

at least one opening embodied in the internal container through which the reducing agent can flow out of the external container into the internal container and vice versa, the at least one opening being disposed in the internal container in such a way that the heating element is completely covered by reducing agent when the internal container is filled with reducing agent up to the at least one opening; and said internal container includes heat-conducting baffles that protrude laterally therefrom into the external container.

16. The tank as defined by claim 15, wherein a return discharges into the internal container, and by way of the return, unused liquid reducing agent is returned.

17. The tank as defined by claim 15, wherein a one-way valve is disposed in a bottom of said internal container providing one-way flow from said external container into said internal container.

18. A tank for storing a reducing agent, in particular a liquid reducing agent, with which nitrogen oxides from exhaust gases of internal combustion engines are reduced to nitrogen and water, comprising:

an external container;

an internal container received in the external container, the internal container connected with the external container in such a way that liquid reducing agent can flow out of the internal container into the external container;

a heating element is received in the internal container;

a removal device for removing the liquid reducing agent from the tank having at least one removal line;

at least one opening embodied in the internal container through which the reducing agent can flow out of the external container into the internal container and vice versa, the at least one opening being disposed in the internal container in such a way that the heating element is completely covered by reducing agent when the internal container is filled with reducing agent up to the at least one opening; and said internal container is surrounded by a funnel-shaped element adjacent an upper end thereof 19. The tank as defined by claim 18, wherein the funnel-shaped element is made from a material that has lesser density than the reducing agent.

20. The tank as defined by claim 19, wherein a return discharges into the external container in such a way that reducing agent which is being returned into the tank via the return flows onto the funnel-shaped element.

21. The tank as defined by claim 20, wherein an encompassing groove is embodied on the funnel-shaped element, in which groove liquid reducing agent that is being returned to the tank via the return accumulates.

22. The tank as defined by claim 21, wherein a one-way valve is disposed in a bottom of said internal container providing one-way flow from said external container into said internal container.

23. The tank as defined by claim 18, wherein a return discharges into the external container in such a way that reducing agent which is being returned into the tank via the return flows onto the funnel-shaped element.

24. The tank as defined by claim 23, wherein an encompassing groove is embodied on the funnel-shaped element, in which groove liquid reducing agent that is being returned to the tank via the return accumulates.

25. The tank as defined by claim 24, wherein a one-way valve is disposed in a bottom of said internal container providing one-way flow from said external container into said internal container.

26. The tank as defined by claim 18, wherein a one-way valve is disposed in a bottom of said internal container providing one-way flow from said external container into said internal container.

* * * * *